United States Patent
Kubo et al.

(10) Patent No.: US 7,003,024 B2
(45) Date of Patent: Feb. 21, 2006

(54) SEMICONDUCTOR DEVICE

(75) Inventors: Eiji Kubo, Hachiouji (JP); Tetsuya Nakagawa, Koganei (JP); Kosaku Aida, Adachi (JP); Nobuya Kasai, Higashimurayama (JP); Mark Walton, Reading (GB)

(73) Assignee: Hitachi, Ltd., Tokyo (JP)

( * ) Notice: Subject to any disclaimer, the term of this patent is extended or adjusted under 35 U.S.C. 154(b) by 838 days.

(21) Appl. No.: 09/996,893

(22) Filed: Nov. 30, 2001

(65) Prior Publication Data

US 2002/0073300 A1    Jun. 13, 2002

(30) Foreign Application Priority Data

Dec. 1, 2000   (GB) ................................. 0029365
Apr. 11, 2001  (JP) ............................. 2001-112375

(51) Int. Cl.
*H04B 1/38*   (2006.01)
*H04L 5/16*   (2006.01)

(52) U.S. Cl. ..................... 375/220; 375/345
(58) Field of Classification Search ............... 375/345, 375/354, 220, 217; 455/245.1, 250.1; 712/1; 710/1

See application file for complete search history.

(56) References Cited

U.S. PATENT DOCUMENTS 5,005,168 A * 4/1991 Cummiskey et al. ....... 370/276
5,177,734 A * 1/1993 Cummiskey et al. ....... 370/290
5,652,712 A * 7/1997 Szczebak et al. ............. 702/85
5,757,858 A * 5/1998 Black et al. ................. 375/295
6,147,979 A * 11/2000 Michel et al. ............... 370/292
6,373,827 B1 * 4/2002 Tayebi et al. ............... 370/310
6,563,801 B1 * 5/2003 Makinen et al. ............ 370/276
6,751,203 B1 * 6/2004 Eshmawy et al. .......... 370/286

FOREIGN PATENT DOCUMENTS

JP     7-240782    9/1995
JP     9-284364    10/1997

* cited by examiner

*Primary Examiner*—Jean B. Corrielus
(74) *Attorney, Agent, or Firm*—Mattingly, Stanger, Malur & Brundridge,. P.C.

(57) ABSTRACT

A semiconductor device comprises a DSP (Digital Signal Processor), a CPU for controlling the DSP and an interface circuit. The interface circuit comprises an input circuit, a gain-adjusting circuit and an output circuit. The input circuit inputs a digital signal and supplies the signal to the DSP synchronously with a first clock signal. The gain-adjusting circuit is capable of adjusting the gain of the digital signal supplied to the input circuit. The output circuit adds a digital signal received from the DSP to the digital signal with the gain thereof adjusted and outputs a signal obtained as a result of the addition synchronously with the first clock signal. A signal path extended from the input circuit through the gain-adjusting circuit to the output circuit forms hardware. A digital signal to be transmitted propagates through the hardware to be subjected to the so-called side-tone processing. As a result, it is possible to provide a semiconductor device capable of generating a side tone without increasing the magnitude of a load borne by a CPU and without requiring an external circuit component.

7 Claims, 8 Drawing Sheets

| REGISTER NAME | ADDRESS | R/W (Read/Write) | ACCESS SIZE |
|---|---|---|---|
| INPUT SHIFT REGISTER(30) | -- | -- | 16 bit |
| INPUT REGISTER(31) | 0x10000000 | R/W | 16 bit |
| OUTPUT SHIFT REGISTER(37) | -- | -- | 16 bit |
| OUTPUT REGISTER(35) | 0x10000002 | R/W | 16 bit |
| GAIN CONTROL REGISTER(34) | 0x10000004 | R/W | 8 bit |
| ⋮ | ⋮ | ⋮ | ⋮ |

FIG.5

| GAIN CONTROL REGISTER(34) DATA | BIT SHIFT OPERATION DATA |
|---|---|
| 0x00 | NONE |
| 0x01 | 1BIT |
| 0x02 | 2BIT |
| ⋮ | ⋮ |
| 0x0F | 15BIT |
| 0x10 | 16BIT |

FIG.6

| No | INPUT SHIFT REGISTER(30) DATA | GAIN CONTROL REGISTER(34) DATA | OUTPUT REGISTER(35) DATA | SHIFTER DATA | OUTPUT SHIFT REGISTER(37) DATA |
|---|---|---|---|---|---|
| 1 | 0x00FF | 0x02 | 0x0F00 | 0x003F | 0x0F3F |
| 2 | 0x00FE | 0x02 | 0x0F10 | 0x003F | 0x0F4F |
| 3 | 0x008F | 0x02 | 0x0F00 | 0x0023 | 0x0F23 |
| ⋮ | ⋮ | ⋮ | ⋮ | ⋮ | ⋮ |

SEMICONDUCTOR DEVICE

BACKGROUND OF THE INVENTION

The present invention relates to a semiconductor device such as a data processor, a microprocessor or a microcomputer, which includes a CPU and a signal-processing circuit. More particularly, the present invention relates to an effective technique adapted to generation of a side tone in a hand telephone (a cellular phone) or the like Apparatuses such as a hand phone for transmitting and receiving an audio signal in duplex communications have a side-tone function. The side-tone function is a function to combine a voice of the user input from a microphone with a voice received from a communication partner and output the combined voices to a speaker during a conversational communication. For example, in Japanese Patent Laid-open No. Hei 7-240782, there is disclosed a hardware technology whereby an audio signal to be transmitted from an A/D converter is supplied to a variable-gain amplifier, being converted into a side tone added to a voice received from a communication partner during a conversational communication before being output to a speaker through D/A conversion. In addition, a processor is also capable of carrying out side-tone processing by execution of software as is disclosed in Japanese Patent Laid-open No. Hei 9-284364.

With the hardware technology for generating a side tone as described above, however, external circuit components such as an amplifier to be added externally to a processor are required, making it virtually impossible to apply the technology to fields like a hand phone where requirements such as a low cost, a small size and thinness are demanded. In the case of the software for side-tone processing, on the other hand, the inventors of the present invention discovered a problem that the processor or a CPU embedded in the processor is occupied by side-tone processing for each audio data so that it is feared that other software processing becomes stagnant. Examples of the other software processing include encoding and decoding processes, compression and error correction based on a control by the CPU.

SUMMARY OF THE INVENTION

It is thus an object of the present invention addressing the problems described above to provide a semiconductor device capable of generating a side tone without increasing the magnitude of a load borne by a CPU and without requiring an external circuit component.

The above and other objects as well as novel features of the present invention will become apparent from the description in this specification and accompanying drawings.

An outline of an invention representing those disclosed in this specification is briefly explained as follows.

In a semiconductor device such as a data processor or a microprocessor, a single semiconductor chip comprises: a digital-signal-processing circuit; a CPU for controlling the digital-signal-processing circuit; and an interface circuit for inputting a digital signal synchronously with a first clock signal and supplying the input digital signal to the digital-signal-processing circuit and for outputting digital data processed by the digital-signal-processing circuit synchronously with the first clock signal, and the interface circuit includes: an input circuit for inputting a digital signal synchronously with the first clock signal and supplying the input digital signal to the digital-signal-processing circuit; a gain-adjusting circuit capable of adjusting a gain of the digital signal supplied to the input circuit; and an output circuit for adding the digital signal with the gain thereof adjusted to a digital signal supplied from the digital-signal-processing circuit and outputting a resulting digital signal synchronously with the first clock signal.

Controlled by the CPU, the digital-signal-processing circuit processes a digital signal received from the input circuit and a digital signal to be supplied to the output circuit. Typically, in response to an interrupt signal, the CPU issues a command to the digital-signal-processing circuit, requesting the circuit to carry out processing operations. The semiconductor device is provided in a hand phone typically between an analog front end and a high-frequency unit in an application of processing a signal received or transmitted by the hand phone. In this case, the semiconductor device inputs a digital signal to be transmitted from the analog front end synchronously with predetermined cycles set by an audio sampling frequency and processes the digital signal. On the other hand, a signal received from the high-frequency unit is processed and supplied to the analog front end. The digital-signal-processing circuit carries out these pieces of processing in accordance with control executed by the CPU. At that time, the output circuit adds a part of a digital signal received by the input circuit from the analog front end unit to a digital signal to be supplied to the analog front end. The part of the digital signal received by the input circuit from the front end unit is a signal with the gain thereof adjusted by the gain-adjusting circuit. In this way, a digital signal to be transmitted propagates through a signal path extended from the input circuit through the gain-adjusting circuit to the output circuit and is subjected to the so-called side-tone processing along the signal path. As a result, the side-tone processing can be carried out without execution of software by the CPU wherein, in each sampling period, the CPU would otherwise read out a digital signal from the input circuit and adjust the gain of the digital signal and, in addition, the CPU also would otherwise read out a digital signal from the output circuit and add the signal with the gain thereof adjusted to the digital signal from the output circuit before supplying back a signal obtained as a result of addition to the output circuit. Thus, it is possible to avoid frequent suspensions of control processing of the CPU by periodical interrupts for triggering the side-tone processing. As a result, a side tone can be generated without increasing the magnitude of a load borne by the CPU and without requiring an external circuit component.

As a specific embodiment, the input circuit may be designed to comprise an input shift register for inputting and shifting a digital signal synchronously with a first clock signal and an input register for latching a digital signal input and shifted in the input shift register synchronously with a second clock signal. For such an input circuit, the gain-adjusting circuit may be designed to comprise a shifter capable of inputting and shifting a digital signal inputted and shifted by the input shift register and a gain control register for controlling the number of shift operations carried out by the shifter. In the same way as the input circuit, the output circuit can be designed to comprise an output register for latching digital data processed in the digital-signal processing unit synchronously with the second clock signal, an adder for adding a signal output by the shifter to the latched digital data in the output register and an output shift register for inputting a signal output by the adder and shifting and outputting the signal synchronously with the first clock signal.

By allowing the CPU to make an access to the gain control register to write data into the register, the gain of a side tone can be controlled by software with ease.

In addition, by allowing the CPU to make an access to the input register to write data into the register, 0 can be set in the register to put transmission in the conversational communication in a mute state. Similarly, by allowing the CPU to make an access to the output register to write data into the register, 0 can be set in the register to put reception in the conversational communication in a mute state. In order to make the registers accessible by the CPU, it is necessary to put the registers in an address space of the CPU or, in a word, to connect the registers to the CPU by using a bus.

As an alternative, the output stage of the input register and the output stage of the output register are each provided with a changeover switch for selecting either the output stage or a value of 0 for a mute state. Select control information for driving the changeover switches is stored in a switch control register. By allowing the CPU to make an access to the switch control register to write data into the register, the selective muting described above can be implemented.

DESCRIPTION OF THE PREFERRED EMBODIMENTS

Figure 1:
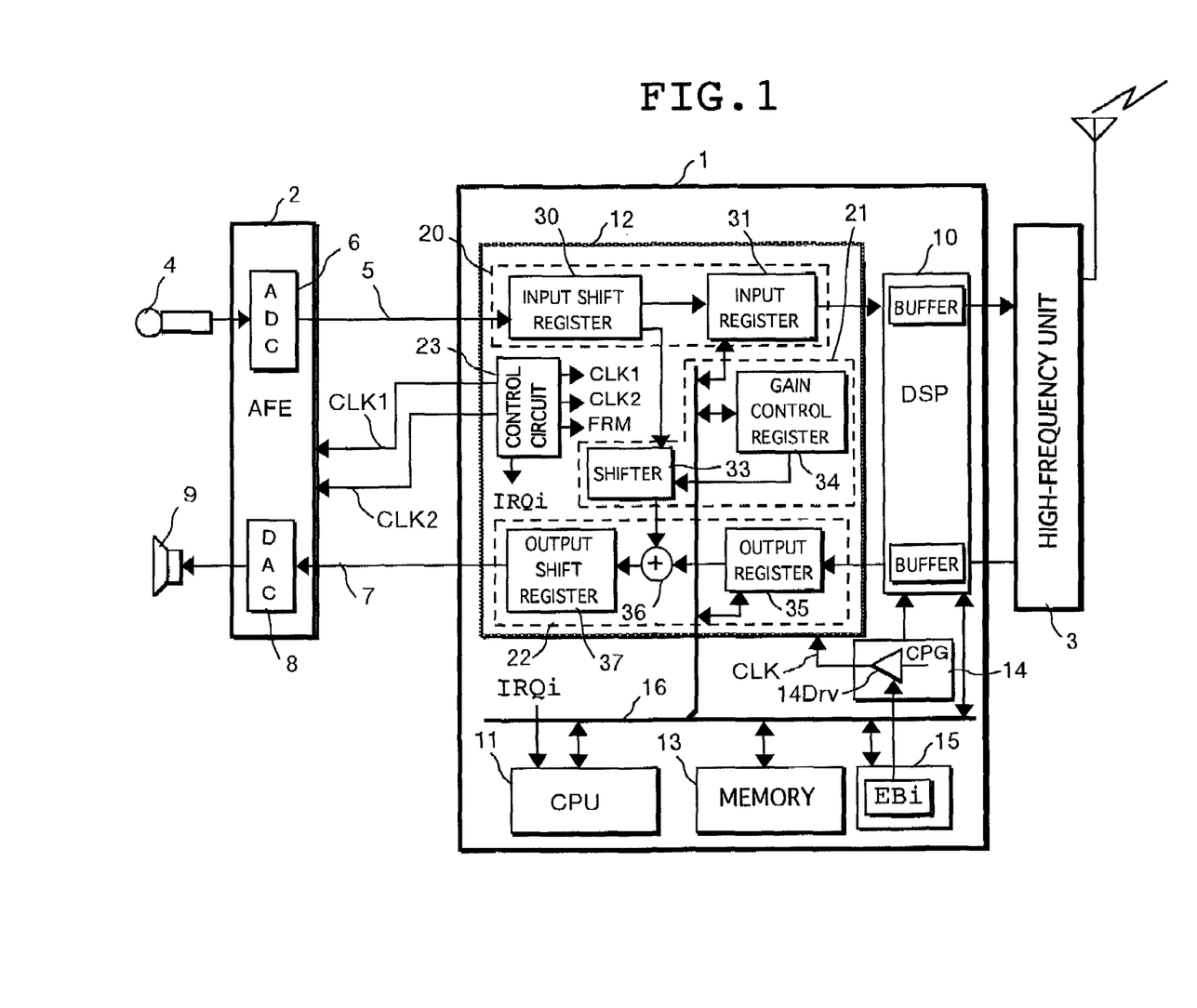
FIG. 1 is a block diagram showing a microprocessor used as an example of a semiconductor device provided by the present invention.

FIG. 1 is a diagram showing, as an example, a microprocessor 1, which is a typical semiconductor device provided by the present invention. The microprocessor 1 shown in the figure is a single semiconductor chip typically made of monolithic silicon. As an alternative, the microprocessor 1 can be created on a semiconductor substrate typically by using a CMOS integrated circuit manufacturing technology. The microprocessor 1 shown in FIG. 1 is employed in a hand phone. Provided between an analog front end (AFE) 2 and a high-frequency unit 3, the microprocessor 1 processes a received signal and a signal to be transmitted.

The analog front end 2 shown in FIG. 1 comprises representative components, namely, an A/D converter (ADC) 6 for converting an analog input audio signal input by a microphone 4 into a digital audio signal 5, and a D/A converter (DAC) 8 for converting a digital audio signal 7 output by the microprocessor 1 into an analog signal supplied to a speaker 9. In addition, the analog front end 2 also includes an AGC (Auto Gain Control) amplifier for amplifying an input analog signal and an output amplifier for amplifying an output analog signal. It should be noted that the AGC (Auto Gain Control) amplifier and the output amplifier themselves are not shown in the figure. The high-frequency unit 3 converts a digital signal received from the microprocessor 1 into a high-frequency signal, which is then transmitted from an antenna. In addition, the high-frequency unit 3 detects a high-frequency signal received by the antenna and supplies the detected signal to the microprocessor 1.

The microprocessor 1 comprises a digital-signal-processing circuit (DSP) 10, a CPU 11 for controlling the digital-signal-processing circuit 10, an interface circuit 12 for inputting and outputting signals exchanged between the analog front end 2 and the digital-signal-processing circuit 10, a memory 13 implemented by typically a DRAM (Dynamic Random Access Memory) serving as a work area of the CPU 11 and a storage area for storing a program, a clock pulse generator (CPG) 14, a control register (CREG) 15 and a bus 16.

The CPU 11 fetches an instruction from the memory 13 in accordance with an instruction execution procedure. The CPU 11 decodes the fetched instruction and has an execution unit for executing the instruction in accordance with a result of decoding. The execution unit comprises an arithmetic logic unit (ALU), shifters, general registers, temporary registers, data buffer registers and an address buffer register, which are not shown in the figure. The CPU 11 inputs an interrupt signal IRQi shown as a representative. When an input interrupt signal is received, the CPU 11 acquires the address of a program associated with an interrupt cause of the interrupt signal. The address of the program is indicated by an interrupt vector associated with the interrupt signal. The CPU 11 then branches to processing of the program at the acquired address.

The DSP 10 has a processing unit including a product-sum processor and a register file for the processor. Processing carried out by the DSP 10 is requested by a command issued by the CPU 11. To put it in detail, the DSP 10 decodes the command issued by the CPU 11 and carries out processing such as encoding and compression on data to be transmitted in accordance with a result of decoding. The data to be transmitted is received from the interface circuit 12. The DSP 10 also carries out processing such as decoding and error correction on received data supplied thereto by the high-frequency unit 3. Units such as the interface circuit 12 generate an interrupt signal to the CPU 11 each time a predetermined event occurs. Receiving the interrupt signal, the CPU 11 issues a command to the DSP 10. The DSP 10 may or may not have an addressing function. In the case of a DSP 10 with no addressing function, the CPU 10 generates an address, which the DSP 11 writes data into or reads data from, in accordance with an addressing mode of the command. This scheme prevents the number of addressing-mode types in the microprocessor 1 as a whole from increasing. That is to say, this scheme is devised to give a high priority to consideration of preventing the size of logic for decoding commands and instruction from becoming too large due to an excessively large number of instruction-code types. Thus, this scheme contributes to reduction of the size of the microprocessor 1 or reduction of the scale of logic.

The CPG 14 is a circuit for generating a synchronization clock signal in the microprocessor 1. A clock signal CLK shown in the figure as a representative is supplied to the interface circuit 12. The CPU 11 is capable of making an access to the control register 15. If the CPU 11 sets an enable bit Ebi of the control register 15 assigned to the interface circuit 12 at a predetermined value such as a logic value of 1, a clock driver 14Drv employed in the CPG 14 is activated, being enabled to output the clock signal CLK. The enable bit Ebi is reset to a logic value of 0 when it is desired to halt the operation of the clock driver 14Drv. In a word, the interface circuit 12 is capable of carrying out operations when the enable bit Ebi is set.

The interface circuit 12 comprises an input circuit 20, a gain-adjusting circuit 21, an output circuit 22 and a control circuit 23. The input circuit 20 inputs a digital signal 5 from the analog front end 2 and outputs the signal to the DSP 10 synchronously with a first clock signal CLK1. The gain-adjusting circuit 21 is capable of adjusting the gain of the digital signal supplied to the input circuit 20. The output circuit 22 adds a digital signal received from the DSP 10 to the digital signal with the adjusted gain and outputs a signal obtained as a result of the addition to the analog front end 2 synchronously with the first clock signal CLK1. That is to say, the interface circuit 12 employed in the microprocessor 1 receives the digital signal 5 from the analog front end 2 synchronously with predetermined cycles set by an audio sampling frequency and processes the signal 5. On the other hand, the interface circuit 12 processes a signal received from the high-frequency unit 3 and supplies the processed signal to the analog front end 2. At that time, the output circuit 22 adds a part of the digital signal 5 received by the input circuit 20 from the front end unit 2 to a digital signal to be supplied to the analog front end 2. The part of the digital signal 5 received by the input circuit 20 from the front end unit 2 is a signal with the gain thereof adjusted by the gain-adjusting circuit 21. In this way, the digital signal 5 to be transmitted propagates through a signal path extended from the input circuit 20 through the gain-adjusting circuit 21 to the output circuit 22, being subjected to the so-called side-tone processing along the signal path. In the side-tone processing carried out by a hand phone or the like, a part of a voice transmitted from the microphone 4 of the transmitting user in a conversational communication is thus fed back to the speaker of the transmitting user, allowing the transmitting user to transmit a voice in the conversational communication while hearing its own voice.

The following description explains a side-phone function implemented by hardware of the interface circuit 12 in detail.

The input circuit 20 comprises an input shift register 30 for inputting and shifting the digital signal 5 synchronously with typically the first clock signal CLK1, and an input register 31 for latching a digital signal input and shifted in the input shift register 30 synchronously with a second clock signal CLK2. For such an input circuit, the gain-adjusting circuit 21 is designed to comprise a shifter 33 capable of inputting and shifting a digital signal inputted and shifted by the input shift register 30 and a gain control register 34 for controlling the number of shift operations carried out by the shifter 33. In the same way as the input shift register, the output circuit 22 is designed to comprise an output register 35 for latching digital data processed in the digital-signal processing unit (DSP) 10 synchronously with the second clock signal CLK2, an adder 36 for adding a signal output by the shifter 33 to the latched data in the output register 35 and an output shift register 37 for inputting a signal output by the adder 36 and shifting and outputting the signal synchronously with the first clock signal CLK1.

The control circuit 23 generates the first and second clock signals CLK1 and CLK2 based on the clock signal CLK. The first clock signal CLK1 has a typical frequency of 128 KHz, which is determined from the audio sampling frequency, even though the frequency of the first clock signal CLK1 does not have to be 128 KHz in particular. The first clock signal CLK1 is also supplied to the analog front end 2 wherein the ADC 6 serially outputs the digital signal 5 to the input shift register 30 synchronously with the clock signal CLK1. Typically, 1 piece of audio data is 16 bits in length even though the length does not have to be 16 bits in particular. In this case, the registers 30, 31, 35 and 36 each have a length of 16 bits too. Accordingly, the frequency of the second clock signal CLK2 is set at one sixteenth of that of the first clock signal CLK1, which is 8 KHz corresponding to a period of 125 microseconds. Thus, the digital signal 5 is latched into the input register 31 and transferred to the shifter 33 in 16-bit units. The DSP 10 carries out signal processing such as encoding in units each consisting of typically 160 pieces of audio data, even though the size of the unit does not have to be 160 pieces of audio data in particular. The control circuit 23 generates a frame signal FRM having a period of 20 msec, which corresponds to 160 pieces of audio data. For each frame FRM, an interrupt signal IRQi is generated to the CPU 11. The interrupt signal IRQi causes the CPU 11 to branch to instruction execution processing for driving the DSP 10 to process a signal to be transmitted for the next 160 pieces of sample data. It should be noted that the control circuit 23 can be provided in the analog front end 2, or outside the microprocessor 1 and the analog front end 2.

Next, the operation of the interface circuit 12 is explained. An analog conversational transmission signal received from the microphone 4 is converted into a digital audio signal 5 by the ADC 6. The digital signal 5 obtained as a result of the A/D conversion is supplied to the input shift register 30. The digital signal 5 is transmitted from the ADC 6 to the input shift register 30 serially in bit units. As the input shift register 30 becomes full, the audio data is transferred to the input register 31 as data to be transmitted to a communication-partner station in a conversational communication. The audio data is also transferred from the input shift register 30 to the shifter 33 to be subjected to processing of the side-tone function. As described above, the input shift register 30 and the input register 31 each have a length of 16 bits. The side-tone processing is carried out later on also in 16-bit units or units of audio sampling data.

The audio data transferred from the input shift register 30 to the shifter 33 is bit-shifted in the shifter 33 in accordance with a value stored in the gain control register 34. For example, the audio data is shifted to the right by 1 bit if it is desired to have a gain of ½. The adder 36 adds the data bit-shifted by the shifter 33 to data stored in the output register 35, that is, audio data received from the communication-partner station. Data obtained as a result of the addition is stored in the output shift register 37. The CPU 11 is capable of directly setting a value in the gain control register 34.

The digital audio data stored in the output shift register 37 is serially transferred to the DAC 8 for converting the data into an analog signal, which is output to the speaker 9 as a voice.

It is thus possible to implement the side-tone function by using the hardware of the interface circuit 12 to carry out the operation described above wherein an input voice received from the microphone 4 is transmitted to the communication-partner station, a part of the input voice received from the microphone 4 is added to a voice received from the communication-partner station and a signal obtained as a result of the addition is output to the speaker 9. The part of the input voice is the input voice with the gain thereof adjusted. In this way, the side-tone processing can be carried out without execution of software by the CPU 11 wherein, in each sampling period, the CPU 11 would otherwise read out a digital signal from the input register 31 and adjust the gain of the digital signal and, in addition, the CPU 11 also would otherwise read out a digital signal from the output register 35 and add the signal with the gain thereof adjusted to the digital signal from the output register 35 before supplying a signal obtained as a result of addition to the output shift register 37. Thus, it is possible to avoid frequent suspensions of control processing of the CPU 11 by periodical interrupts for carrying out the side-tone processing. As a result, a side tone can be generated without increasing the magnitude of a load borne by the CPU 11 and without requiring an external circuit component.

Figure 2:
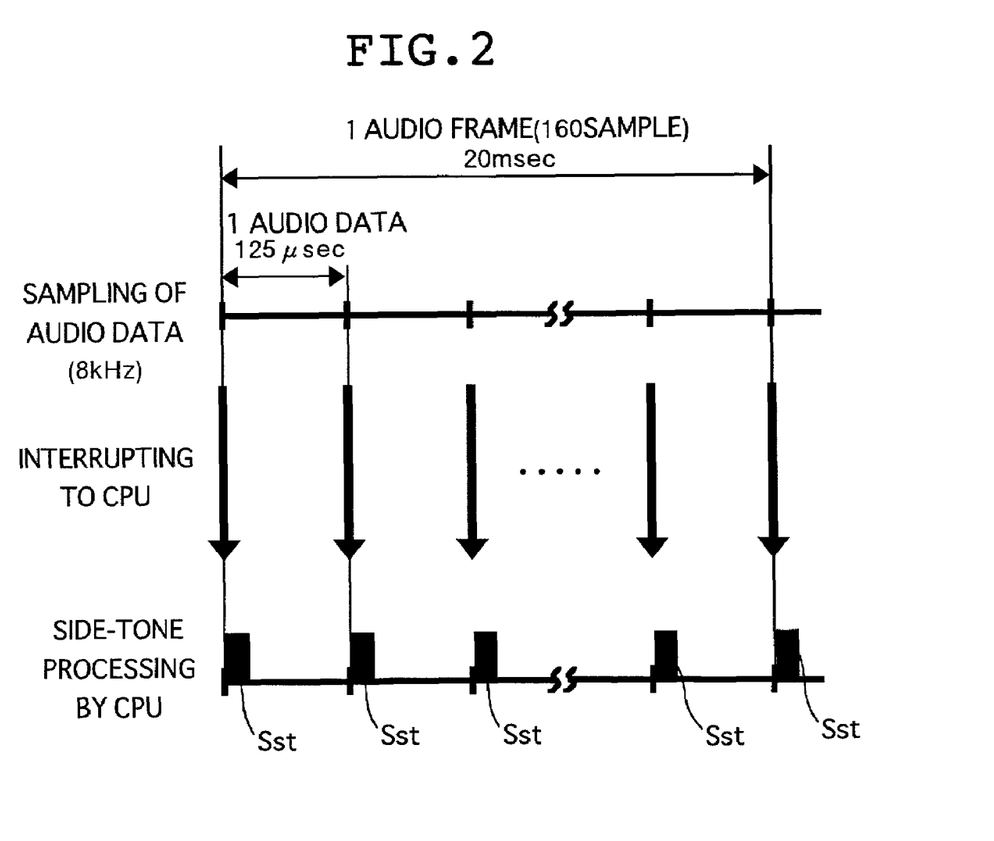
FIG. 2 is an operation time table, which is shown as an example of comparison when an attempt is made to implement a side-tone function in software processing carried out by a CPU.
Figure 3:
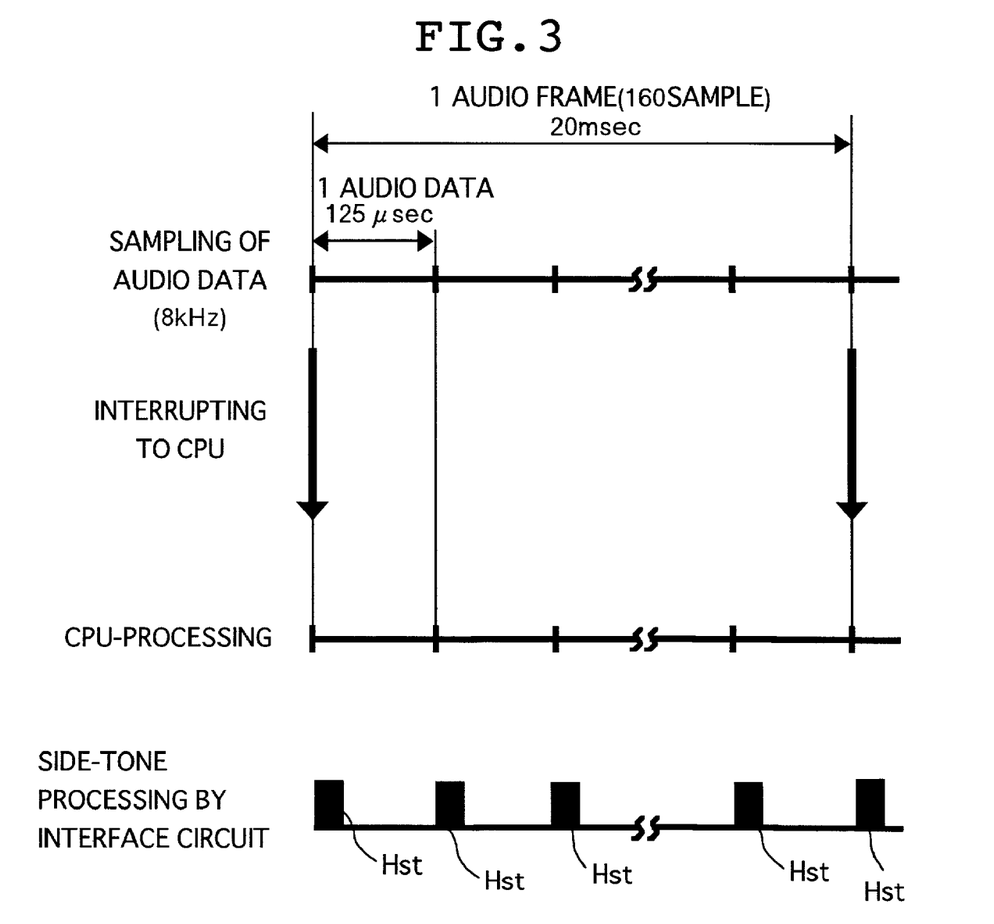
FIG. 3 is an operation time table showing implementation of a side-tone function by hardware of an interface circuit.

The reduction of the magnitude of a load borne by the CPU 11 is explained in more detail as follows. FIG. 2 is an operation time table, which is shown as an example of comparison when an attempt is made to implement a side-tone function in software processing by the CPU 11. Assume that in various kinds of signal processing, the frequency of sampling of audio data in an ordinary hand phone or the like is normally 8 KHz, that is, audio data is sampled at intervals of 125 microseconds, and 1 audio frame consists of 160 samples over a period of 20 msec. In a software technique shown in FIG. 2, an interrupt signal is generated to the CPU 11 for each period to sample audio data, that is, at intervals of 125 microseconds, causing the CPU 11 to carry out side-tone processing set by execution of software. For this reason, the CPU 11 temporarily suspends various kinds of ongoing processing at intervals of 125 microseconds to carry out the side-tone processing. After the execution of the side-tone processing, the suspended processing is resumed. In this way, the magnitude of the software processing load borne by the CPU 11 increases. With the hardware of the interface circuit 12, on the other hand, an interrupt signal is generated to the CPU 11 at intervals of 20 msec or for each audio frame, and the load borne by the CPU 11 to carry out the side-tone processing is no longer necessary as shown in FIG. 3. That is to say, the CPU 11 is capable of processing data properly concurrently with pieces of side-tone processing Hst carried out by the interface circuit 12.

Figure 4:
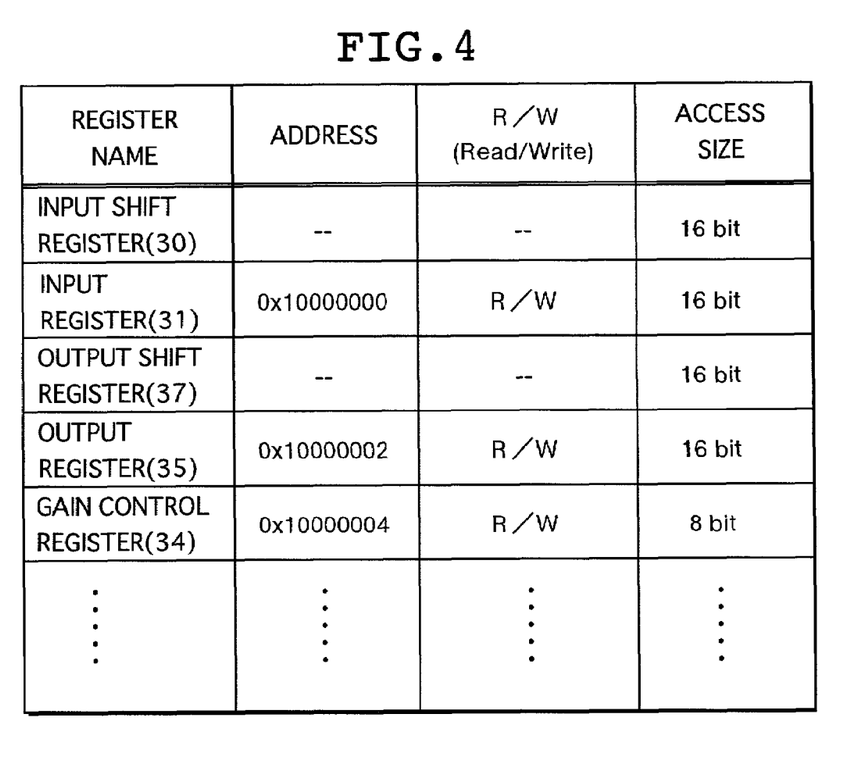
FIG. 4 is a table showing detailed descriptions of registers embedded in the interface circuit.

FIG. 4 is a table showing detailed descriptions of the registers embedded in the interface circuit 12. As shown in the figure, the input shift register 30, the input register 31, the output shift register 37 and the output register 35 each have a length of 16 bits whereas the gain control register 34 is 8 bits in length. The input register 31, the output register 35 and the gain control register 34 are placed in the address space of the CPU 11 and data can thus be directly read out and written by the CPU 11 from and into the registers 31, 35 and 34 through the bus 16. Addresses assigned to the input register 31, the output register 35 and the gain control register 34 as shown in FIG. 4 are typical. It should be noted that a prefix 0x appended to each of the addresses indicates that the address is expressed in the hexadecimal format.

In order to adjust the gain of a side tone, the CPU 11 initializes the gain control register 34. Control data stored in the gain control register 34 determines the quantity of a bit shift carried out by the shifter 33, that is, the number of bits by the contents of the input shift register 30 to be added to the contents of the output register 35 are shifted to the right. Thus, by changing the control data stored in the gain control register 34, the CPU 11 is capable of adjusting the gain of a side tone.

Figure 5:
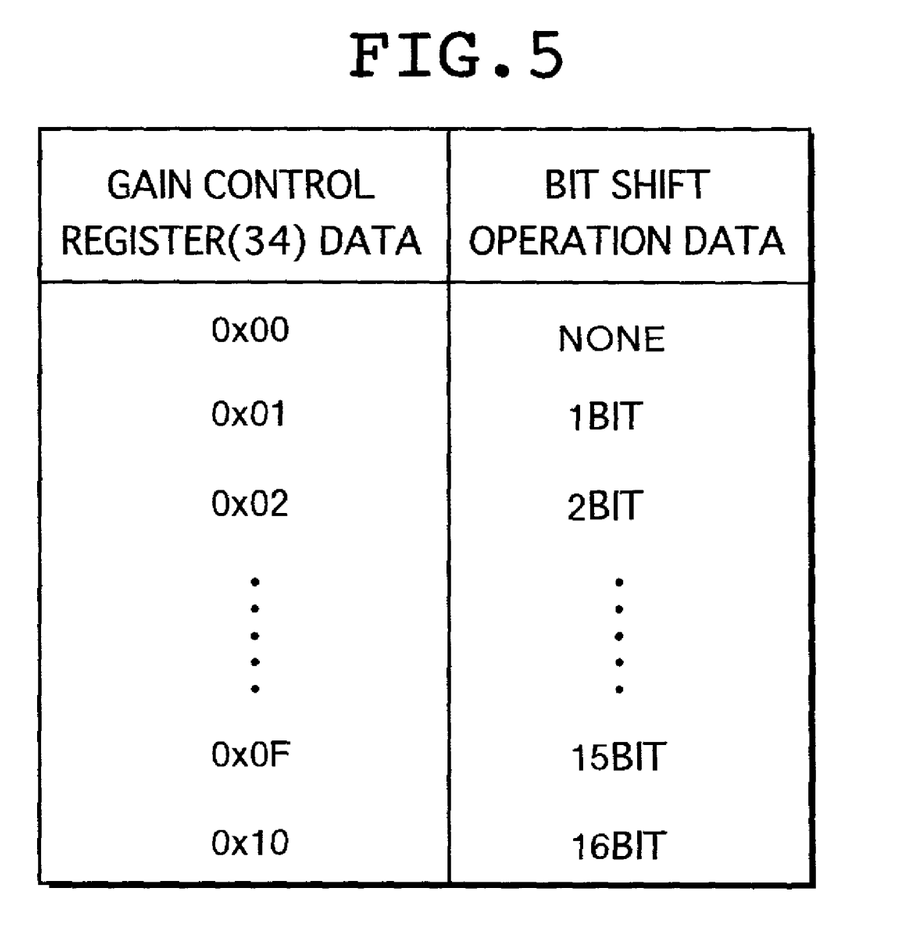
FIG. 5 is a table showing a relation between the value set in a gain control register and the quantity of a bit shift operation.

FIG. 5 is a table showing a relation between the value set in the gain control register 34 and the quantity of a bit shift operation. In this embodiment, the gain control register 34 is 8 bits in length as described above and used for storing 17 different values in the range 0x00 to 0x10 each representing the number of bits by which the audio data in the shifter 33 copied from the input shift register 30 is to be shifted to the right. In the case of a value of 0x02 stored in the gain control register 34, for example, the audio data in the shifter 33 is shifted to the right by 2 bits. The shifted audio data is added to the data stored in the output register 35 by the adder 36 and a result of addition produced by the adder 36 is stored in the output shift register 37. The data stored in the output register 35 is audio data received from the communication-partner station. In this way, the CPU 11 is capable of directly controlling the gain of a side tone by setting a value in the gain control register 34. A value of 16 bits shown in FIG. 5 indicates that no side tone is virtually added.

Figure 6:
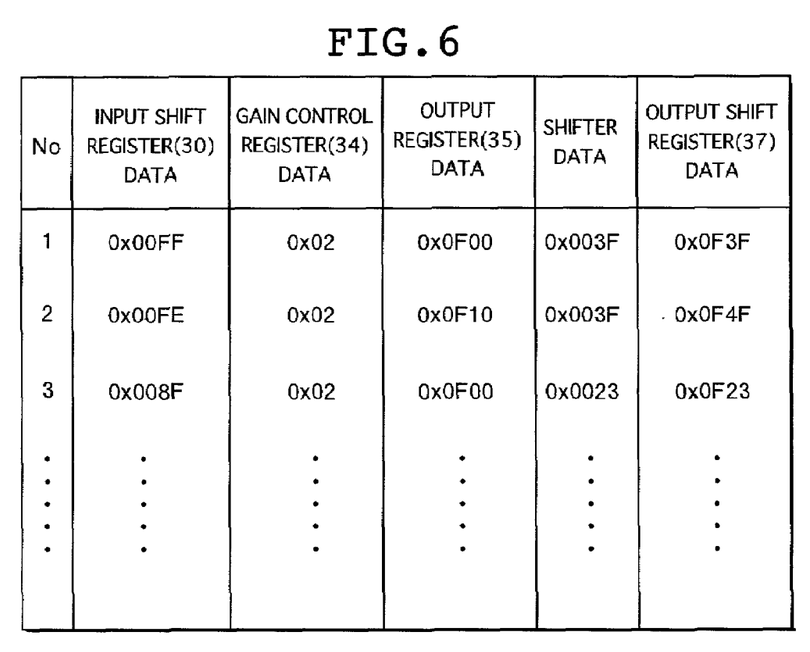
FIG. 6 is a table showing results of various kinds of side-tone processing in terms of pieces of data stored in the registers.

FIG. 6 is a table showing results of various kinds of side-tone processing in terms of pieces of data stored in the input shift register 30, the gain control register 34, the output register 35, the shifter 33 and the output shift register 37. The data stored in the shifter 33 is data obtained or a result of shifting the data stored in the input shift register 30 to the right. The data stored in the output shift register 37 is data obtained as a result of addition of the data stored in the shifter 33 to the data stored in the output register 35. As shown on the first row of the table, pieces of data stored in the 16-bit input shift register 30, the 8-bit gain control register 34, the 16-bit output register 35, the 16-bit shifter 33 and the 16-bit output shift register 37 are 0x00FF, 0x02, 0x0F00, 0x003F and 0x0F3F respectively. The data 0x003F stored in the shifter 33 is data obtained or a result of shifting the data 0x00FF stored in the input shift register 30 to the right by 2 bits. The data 0x0F3F stored in the output shift register 37 is data obtained as a result of addition of the data 0x003F stored in the shifter 33 to the data 0x0F00 stored in the output register 35.

Figure 7:
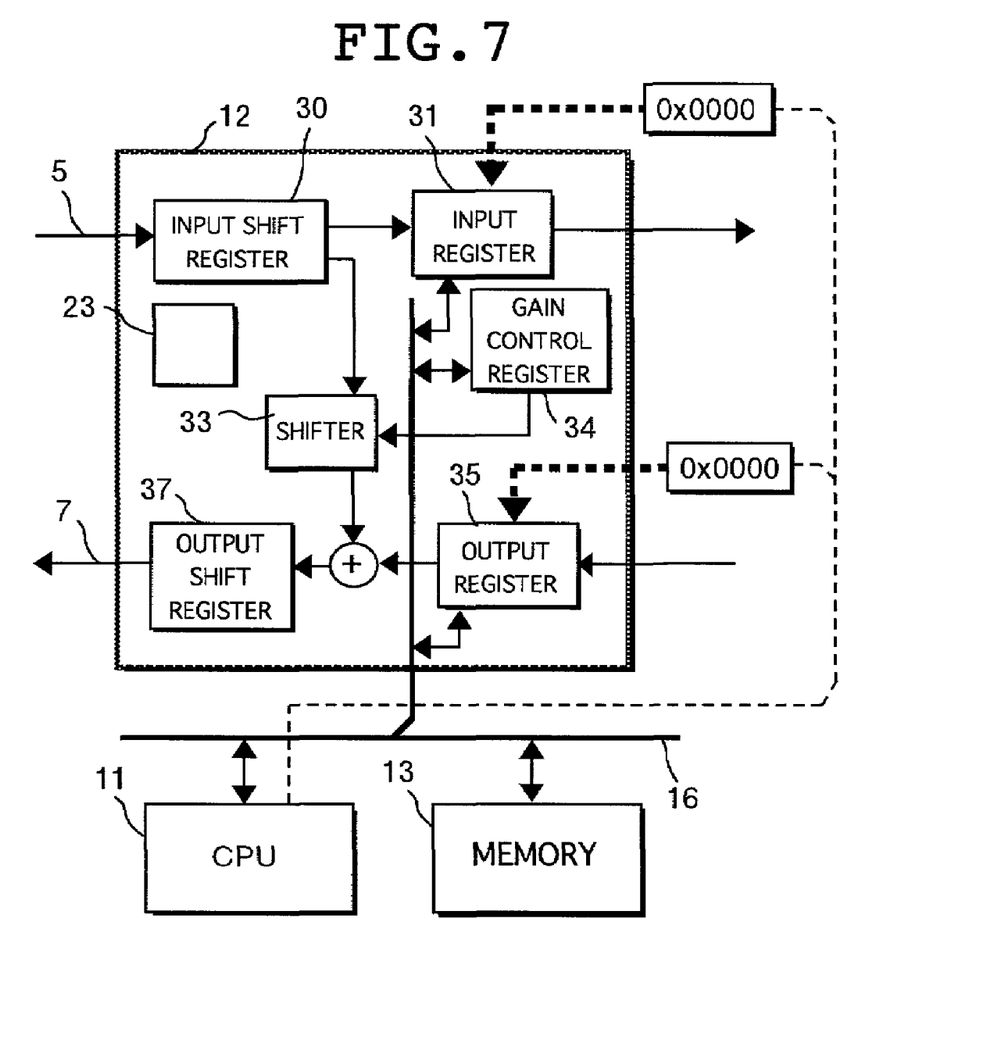
FIG. 7 is a diagram showing typical mute processing carried out by using the interface circuit.

FIG. 7 is a diagram showing typical mute processing carried out by using the interface circuit 12. As described above, the input register 31 and the output register 35 are placed in the address space of the CPU 11 and data can thus be directly read out and written by the CPU 11 from and into the registers 31 and 35 through the bus 16. The CPU 11 is capable of forcibly setting only audio data to be transmitted to the communication-partner station at 0 of the mute state with the side-tone function operated as it is by storing 0x0000 in the input register 31 through the bus 16. In the same way, the CPU 11 is also capable of forcibly setting only audio data received from the communication-partner station at 0 of the mute state with the side-tone function operated as it is by storing 0x0000 in the output register 35 through the bus 16.

Figure 8:
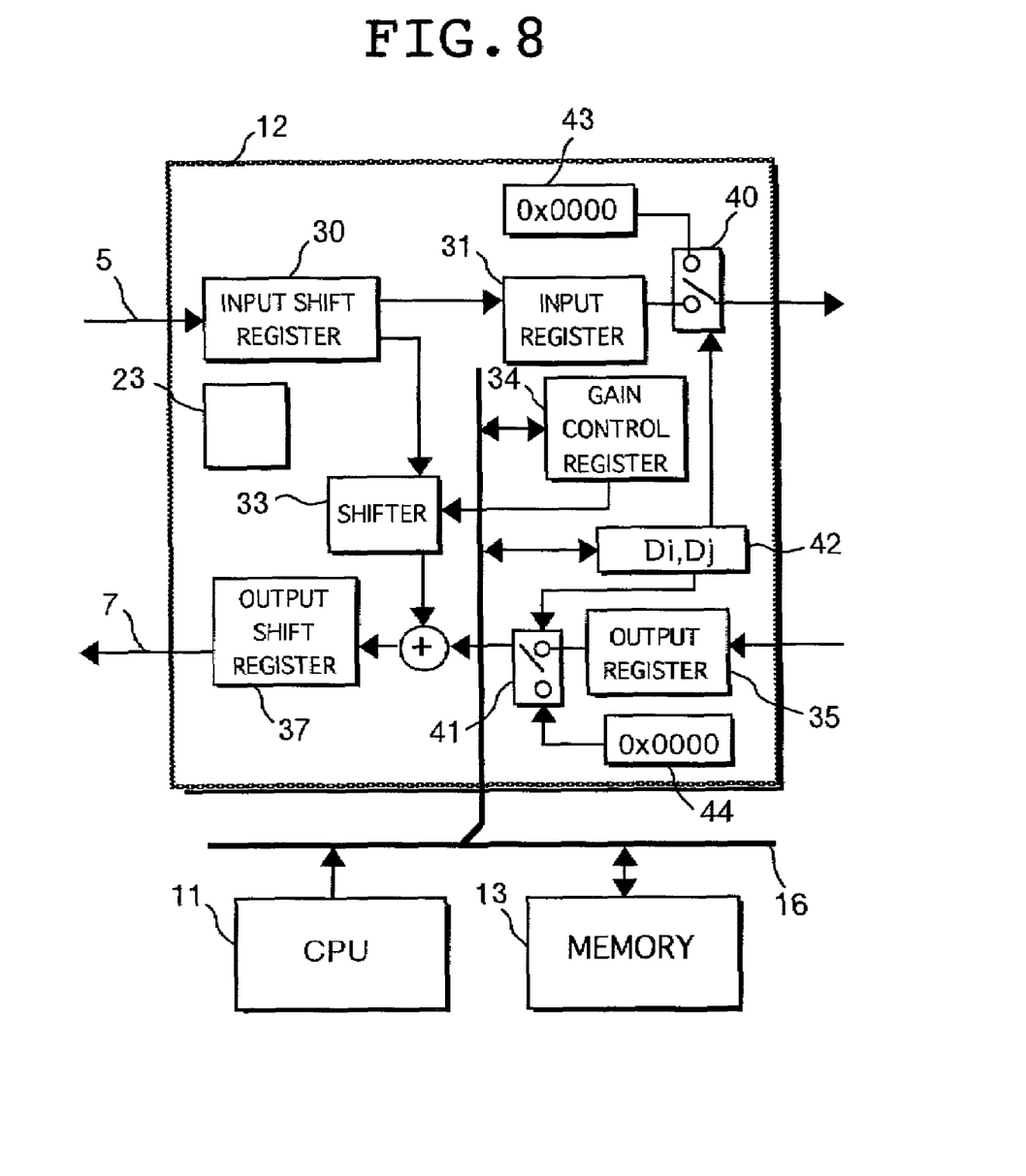
FIG. 8 is a diagram showing another typical mute processing carried out by using the interface circuit.

FIG. 8 is a diagram showing other typical mute processing carried out by using the interface circuit 12. In the embodiment shown in FIG. 8, the output stage of the Input register 31 and the output stage of the output register 35 are respectively provided with changeover switches 40 and 41 each for selecting either the output stage or a value of 0. The value of 0 for the changeover switch 40 is stored in a fixed-value output circuit 43 and the value of 0 for the changeover switch 41 is stored in a fixed-value output circuit 44. The fixed-value output circuits 43 and 44 are each implemented by a high-resistance pull-down circuit for generating all 16 bits of 0 or 0x0000. Select control information for driving the changeover switches 40 and 41 is stored in a switch control register 42, which is also mapped onto an address in the address space of the CPU 11. By allowing the CPU 11 to make an access to the switch control register 42 to write data into the register 42 through the bus 16, the selective muting described above can be implemented. Assume that a predetermined bit Di in the switch control register 42 is assigned to the changeover switch 41 as a switch control bit. Similarly, a predetermined bit Dj in the switch control register 42 is assigned to the changeover switch 40 as a switch control bit. By resetting the switch control bits Di and Dj to 0, the changeover switches 41 and 40 are driven to select the outputs of the output register 35 and the input register 31 respectively. By setting the switch control bits Di and Dj at 1, on the other hand, the changeover switches 41 and 40 are each driven to select the value of 0. The transmission of audio data to the communication-partner station can be put in a mute state by the CPU 11 by setting the switch control bit Dj at 1 to drive the changeover switch 40 on the transmission side to select the value of 0 to result in a mute state. In this state, audio data transmitted to the communication-partner station is reset at all 0s. On the other hand, the reception of audio data by this station can be put in a mute state by the CPU 11 by setting the switch control bit Di at 1 to drive the changeover switch 41 on the reception side to select the value of 0. In this state, audio data received by this station is reset at all 0s to result in a mute state. It should be noted that the fixed-value output circuits 43 and 44 can also be implemented by a single circuit common to the changeover switches 40 and 41.

In accordance with the microprocessor 1 described above, by adding a simple digital circuit to the embedded interface circuit 12, the side-tone and mute functions in a hand phone or the like can be implemented by hardware. Thus, it is possible to reduce the cost, the size and the thickness of the hand phone or the like as well as to decrease the magnitude of a software-processing load borne by the CPU.

The invention discovered by the inventor has been exemplified concretely by using an embodiment as described above. It should be noted, however, that the scope of the invention is not limited to the details of the embodiment. It is needless to say that a variety of changes and modifications can be made to the embodiment without departing from the gist and the true spirit of the present invention.

For example, it is possible to mount peripheral circuits such as a ROM or a timer on the semiconductor device provided by the present invention besides the DSP, the CPU and the interface circuit. In addition, the interface circuit does not have to adopt a serial interface but may use a parallel interface instead. Moreover, the present invention can be applied to a wide range and a variety of so-called semiconductor devices including a microprocessor, a data processor, a system LSI, a protocol controller and a mixed chip of a DRAM and a logic LSI.

The following description explains a representative effect exhibited by the present invention disclosed in this specification briefly.

By adding a simple digital circuit comprising a shifter and an adder to an interface circuit employed in a semiconductor device including a CPU and a digital-signal-processing circuit, the side-tone and mute functions in a hand phone or the like can be implemented by hardware. As a result, it is possible to reduce the cost, the size and the thickness of the hand phone or the like as well as to decrease the magnitude of a software-processing load borne by the CPU.

What is claimed is:

1. A semiconductor device formed on a single semiconductor chip, comprising:
    a digital-signal-processing circuit;
    a CPU controlling said digital-signal-processing circuit: and
    an interface circuit inputting a digital signal synchronously with a first clock signal and supplying said input digital signal to said digital-signal-processing circuit and outputting digital data processed by said digital-signal-processing circuit synchronously with said first clock signal,
    wherein said interface circuit includes:
    an input circuit inputting said digital signal synchronously with said first clock signal and supplying said input digital signal to said digital-signal-processing circuit;
    a gain-adjusting circuit adjusting a gain of said digital signal supplied to said input circuit; and
    an output circuit adding said digital signal with said gain thereof adjusted to a digital signal supplied from said digital-signal-processing circuit and outputting a resulting digital signal synchronously with said first clock signal;
    wherein said input circuit comprises:
    an input shift register inputting and shifting the digital signal synchronously with said first clock signal; and
    an input register latching the digital signal shifted in said input shift register synchronously with a second clock signal.

2. A semiconductor device according to claim 1, wherein said gain-adjusting circuit comprises:
    a shifter for inputting and shifting the digital signal inputted and shifted by said input shift register; and
    a gain control register controlling the number of shift operations carried out by said shifter.

3. A semiconductor device according to claim 2, wherein said output circuit comprises:
    an output register latching the digital signal processed by said digital-signal processing unit synchronously with said second clock signal;
    an adder adding a signal output by said shifter to said latched digital data in said output register; and
    an output shift register inputting a signal output by said adder and shifting and outputting said signal synchronously with said first clock signal.

4. A semiconductor device according to claim 2, wherein said CPU is configured to access said gain control register to write data into said gain control register.

5. A semiconductor device according to claim 3, wherein said CPU is configured to access said input register and said output register to write data into said input and output registers.

6. A semiconductor device according to claim 3, wherein:
    an output stage of said input register and an output stage of said output register are each provided with a changeover switch selecting either said output stage or a value of 0;
    select control information for driving said changeover switches is stored in a switch control register; and
    said CPU is configured to access said switch control register to write data into said switch control register.

7. A semiconductor device according to claim 1, wherein, in response to an interrupt signal, said CPU issues a command to said digital-signal-processing circuit, requesting said digital-signal-processing circuit to carry out processing operations.

* * * * *